(12) United States Patent
Kamijoh et al.

(10) Patent No.: US 9,106,366 B2
(45) Date of Patent: Aug. 11, 2015

(54) DISTRIBUTING DATA TO MULTIPLE CLIENTS FROM SERVER

(71) Applicant: International Business Machines Corporation, Armonk, NY (US)

(72) Inventors: Kohichi Kamijoh, Tokyo (JP); Hisashi Miyashita, Kanagawa (JP); Hiroaki Nakamura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 13/713,190

(22) Filed: Dec. 13, 2012

(65) Prior Publication Data

US 2013/0159697 A1      Jun. 20, 2013

(30) Foreign Application Priority Data

Dec. 16, 2011   (JP) .................................. 2011-275694

(51) Int. Cl.
*H04L 9/28*       (2006.01)
*H04L 9/00*       (2006.01)
(Continued)

(52) U.S. Cl.
CPC .. *H04L 9/00* (2013.01); *H04L 9/28* (2013.01); *H04N 21/2347* (2013.01); *H04N 21/25875* (2013.01); *H04N 21/4405* (2013.01); *H04N 21/4753* (2013.01); *H04N 21/654* (2013.01);
(Continued)

(58) Field of Classification Search
CPC ........ H04L 9/28; H04L 9/00; H04N 21/4405; H04N 21/2347; H04N 21/654; H04N 21/8193; H04N 21/4753; H04N 21/26613; H04N 21/25875

USPC .......................................................... 713/150
See application file for complete search history.

(56) References Cited

U.S. PATENT DOCUMENTS 4,169,993 A  * 10/1979 Taylor et al. .................... 380/34
6,430,301 B1 *  8/2002 Petrovic ....................... 382/100
(Continued)

FOREIGN PATENT DOCUMENTS

| JP | 2001216763   | 8/2001 |
|----|--------------|--------|
| JP | 2003218853 A | 7/2003 |

(Continued)

OTHER PUBLICATIONS

Hartung et al. "Fast public-key watermarking of compressed video." Image Processing, 1997. Proceedings., International Conference on. vol. 1, 1997. pp. 528-531.*

(Continued)

*Primary Examiner* — Saleh Najjar
*Assistant Examiner* — Oleg Korsak
(74) *Attorney, Agent, or Firm* — Gail H. Zarick; Ryan, Mason & Lewis, LLP

(57) ABSTRACT

Provided are techniques for distributing data in a trackable manner while suppressing an increase in the size of data to be distributed as much as possible and minimizing interruption of usage of the data. A method for distributing data to multiple clients from a server includes the steps of: generating a common noise by using noises unique to the multiple clients, respectively; embedding the common noise in the data to be distributed to make the data unusable; and distributing the data containing the embedded common noise, so that the data containing the embedded common noise is made usable by each of the multiple clients using a unique noise generated in the client.

19 Claims, 13 Drawing Sheets

(51) Int. Cl.
*H04N 21/2347* (2011.01)
*H04N 21/258* (2011.01)
*H04N 21/4405* (2011.01)
*H04N 21/475* (2011.01)
*H04N 21/654* (2011.01)
*H04N 21/81* (2011.01)
*H04N 21/266* (2011.01)

(52) U.S. Cl.
CPC ...... *H04N 21/8193* (2013.01); *H04N 21/26613* (2013.01)

(56) References Cited

U.S. PATENT DOCUMENTS

| | | | |
|---|---|---|---|
| 6,496,591 B1* | 12/2002 | Rhoads | 382/100 |
| 7,562,228 B2* | 7/2009 | Kirovski et al. | 713/186 |
| 7,664,332 B2* | 2/2010 | Wong et al. | 382/240 |
| 7,748,051 B2* | 6/2010 | Morimoto et al. | 726/32 |
| 8,020,004 B2* | 9/2011 | Winograd | 713/179 |
| 8,103,879 B2* | 1/2012 | Levy et al. | 713/176 |

FOREIGN PATENT DOCUMENTS

| | | |
|---|---|---|
| JP | 2003264549 A | 9/2003 |
| JP | 2003284023 A | 10/2003 |
| JP | 2004078477 A | 3/2004 |
| JP | 2005051735 A | 2/2005 |
| JP | 2007026648 | 2/2007 |
| JP | 2007097128 | 4/2007 |
| JP | 2007525729 | 9/2007 |
| JP | 2010109787 A | 5/2010 |
| JP | 2010529813 A | 8/2010 |
| JP | 2011076616 | 4/2011 |
| JP | 2011086313 | 4/2011 |
| JP | 2011199515 A | 10/2011 |
| JP | 2011244460 A | 12/2011 |
| WO | 0013414 A1 | 3/2000 |

OTHER PUBLICATIONS

Lemma et al. "Secure Watermark Embedding Through Partial Encryption", IWDW 2006, LNCS 4283, pp. 433-445, 2006.*
Kirovski et al. "A Dual Watermark-Fingerprint System", MultiMedia, IEEE 11.3 (2004): pp. 59-73.*
Langelaar "Real-time Watermarking Techniques for Compressed Video Data", Thesis Delft University of Technology, 2000, ISBN 90-9013190-6, 158 pages.*
Kundur et al. "Video Fingerprinting and Encryption Principles for Digital Rights Management", Proceedings of the IEEE, vol. 92, No. 6, Jun. 2004, pp. 918-932.*
D. Naor et al., "Revocation and Tracing Schemes for Stateless Receivers," Crypto, 2001, Lecture Notes in Computer Science, vol. 2139, pp. 41-62.

* cited by examiner

DISTRIBUTING DATA TO MULTIPLE CLIENTS FROM SERVER

PRIORITY CLAIM

The present application claims priority to the Japanese patent application identified as 2011-275694, filed on Dec. 16, 2011, and entitled "Method, Program and System for Distributing Data to Multiple Clients from Server," the disclosure of which is incorporated by reference herein in its entirety.

FIELD

The field generally relates to an information processing technique and more particularly to distributing data to multiple clients from a server.

BACKGROUND

Due to the wide-spread use of network techniques such as the Internet and an intranet, distribution and sharing of various types of data, such as documents, video and still image content, and engineering data, over a network are quite common. Since some of the data have confidential information or are copyrighted, there are used techniques for protecting such data and for investigating the leaker of confidential information or the copyright infringer. One technique is to scramble distributed data by embedding noise therein, and another is to embed data used for tracking (generally called "forensic data").

SUMMARY

Embodiments of the invention provide techniques for distributing data to multiple clients from a server.

For example, in one embodiment, a method for distributing data to a plurality of clients from a server includes the steps of: generating a common noise by using noises unique to the plurality of clients, respectively; embedding the common noise in the data to be distributed to make the data unusable; and distributing the data containing the embedded common noise, so that the data containing the embedded common noise is made usable by each of the plurality of clients using a unique noise generated in the client.

Further embodiments of the invention comprise one or more of the following features.

The unique noise is a synthesis of a first noise and a second noise, the first noise having a larger amplitude than the second noise. Moreover, the unique noise is generated according to a given parameter. Further, the unique noise $N(k,t)$ of a client k which is one of the plurality of clients is obtained according to the following formula:

$$N(k,t)=\alpha \text{rand}(t+s_0)+\beta \text{rand}(t+s_{1k})$$

where $N(k,t)$ is the unique noise of client k, rand( ) is random number generation function having very long cycle (T), t is a variable, $\alpha$ and $\beta$ are coefficients such that When the parameter is $t_0$, the parameter $t_0$ is obtained according to the following formula:

$$t_0 = \arg\max_t A(t, \Delta t)$$

where $$A(t, \Delta t) = \min_{p,q \in D, p \neq q} \int_t^{t+\Delta} (N(p, t) - N(q, t)) dt$$

where A is a minimum difference, t is a variable, $\Delta t$ is the length in number of cycles) of noise necessary for embedding in content to be distributed, D is a set of clients included in distribution list, p,q is any combination of members in D, and $N(q,t)$ is the unique noise of client k.

The distributing step includes a step of sending the parameter, and the data containing the embedded common noise is made usable by each of the clients using the unique noise generated according to the parameter received by the client.

Distribution data including the parameter and the data containing the embedded common noise is sent to each of the plurality of distribution-target clients, the distribution data encrypted by using an encryption key unique to the client, each of the clients is provided with the parameter by decrypting the distribution data using a decryption key unique to the client.

The generating step includes a step of calculating the mean of the unique noises of the plurality of clients, respectively. It is preferable that the server includes a mechanism for generating the unique noises of all the plurality of clients, and each of the plurality of clients includes a mechanism for generating its own unique noise.

The data includes a variable-length code (VLC) portion, and the embedding step includes a step of changing the VLC portion included in the data based on the common noise. It is further preferable that the changing step includes the steps of: determining a map generated based on the common noise for a set of VLCs having an equal length; and replacing a VLC in the data according to the map. It is further preferable that labeling members included in the set of equal-length codes; and replacing a given VLC portion with a VLC corresponding to a label after replacement calculated according to the following formula:

$$L'=(L-N_p(t))\bmod c$$

where L' is the label corresponding to VLC after replacement, L is the label corresponding to VLC before replacement, $N_p(t)$ is common noise, and c is a number of members in set of VLCs having certain length.

The common noise is embedded in at least any of a DCT coefficient, a DC component, a macroblock pattern and a motion vector of the data.

The changing step includes a step of changing a level of the VLC portion based on the common noise. It is preferable that the step of changing the level of the VLC portion includes a step of embedding information indicating in which direction, positive or negative, the level is changed.

In the step of embedding the common noise, a common noise amplified or damped based on a predetermined coefficient is embedded in the data. It is preferable that when the unique noise of a client k which is one of the plurality of clients is $N(k,t)$, the predetermined coefficient is determined by a function dependent on a variable t.

The data to be distributed is data of a still image or video. It is preferable that the method further includes a step of receiving a distribution list D specifying a plurality of clients to which the data is to be distributed.

Although an overview of an embodiment of the invention has been described above as a method for distributing data to multiple clients from a server, embodiments of the invention also include systems, programs, program products, software, software products, devices, or the like. For example, the program product or the software product can include storage media storing the program or the software or can include media for transmitting the program or the software.

These and other objects, features and advantages of embodiments of the invention will become apparent from the following detailed description of illustrative embodiments thereof, which is to be read in connection with the accompanying drawings.

DETAILED DESCRIPTION

Figure 1:
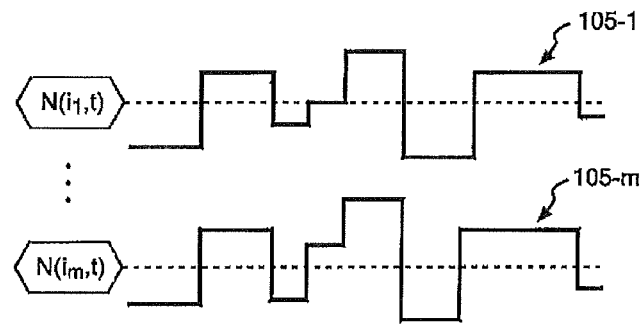
FIG. 1 is an example of an image of a unique noise of a client in an embodiment of the present invention.

While a mode for carrying out embodiments of the present invention will now be described in detail with reference to the drawings, the following embodiments are not to restrict the invention recited in the claims for patent. Further, all the combinations of the features discussed in the embodiments are not necessarily indispensable for the solving means of the invention.

Moreover, the present invention can be carried out in many different modes, and should not be interpreted as being limited to what is described in a particular embodiment. Throughout the description of the embodiment, the same components are given the same reference numerals.

If the server embeds forensic data in video content to be distributed to multiple clients, for example, the size of data distributed is large. As an example, in the case of distributing video content to multiple clients, the size of data is extremely large in some cases, because as many pieces of forensic data as the number of distribution target clients need to be embedded at certain time intervals.

On the other hand, if a client embeds forensic data in data when descrambling the data, an attacker may acquire and redistribute the descrambled data, i.e., the data yet to contain the forensic data. In this case, it is no longer possible to identify to which client group the leaked data was firstly distributed and from which client the data was leaked or the like. As a result, tracking of the attacker may be difficult in this case. Moreover, the embedding of forensic data may cause deformation of the content in either of the aforementioned cases.

As is understandable from the above background, there is a demand for a data distribution technique that suppresses an increase in the size of distributed data as much as possible and allows effective tracking of an attacker while minimizing interruption of usage of the content.

Accordingly, embodiments of the invention provide methods, programs, and systems for distributing data to multiple clients from a server that are improved to meet the demand described above.

In an embodiment of the invention, a particular video content, which is data to be distributed, is distributed to multiple clients from a server and is thereby shared by them. Each of the clients is provided with a mechanism for generating unique noise data (called simply a "unique noise" herein) according to given parameter $t_0$. The server has a mechanism for generating a unique noise of all of the clients according to parameter $t_0$.

In an embodiment of the invention, the unique noise of each client is a synthesis of a first noise which is common to all the clients and a second noise unique to the client, and the first noise has a larger amplitude than the second noise here. As a result, the unique noise of each client has a similar form to those of the other clients. FIG. 1 shows an example of an image of unique noises $N(i_j, t)$ (j–i . . . m)(105-1 . . . 105-m) of m clients to which content is to be distributed, among n clients existing in a system.

Figure 2:
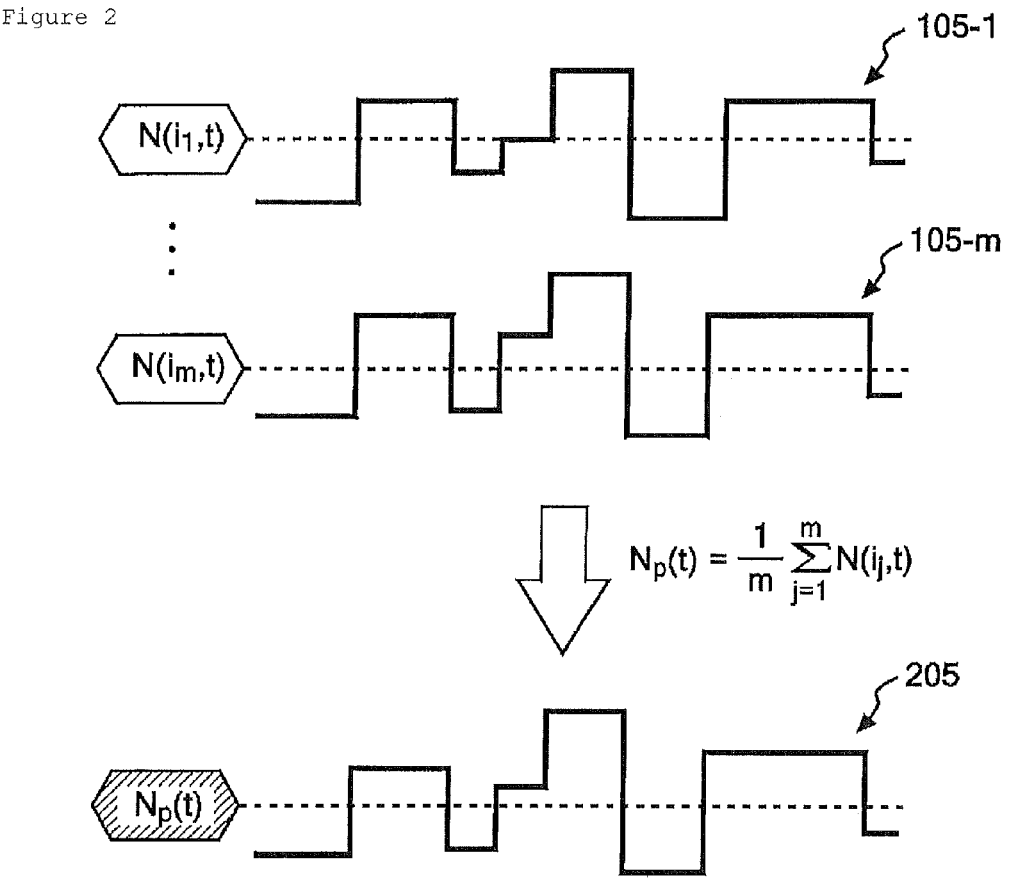
FIG. 2 is an example of an image of a common noise in the embodiment of the present invention.

Next, the server generates common noise data (simply called a "common noise" herein) using the unique noises of the respective m clients to which the content is to be distributed. The common noise is similar to each of the unique noises. In some embodiments, the common noise is, preferably, obtained by calculating the mean of the unique noises. FIG. 2 shows an example of an image of a common noise $N_p(t)$(205).

Figure 3:
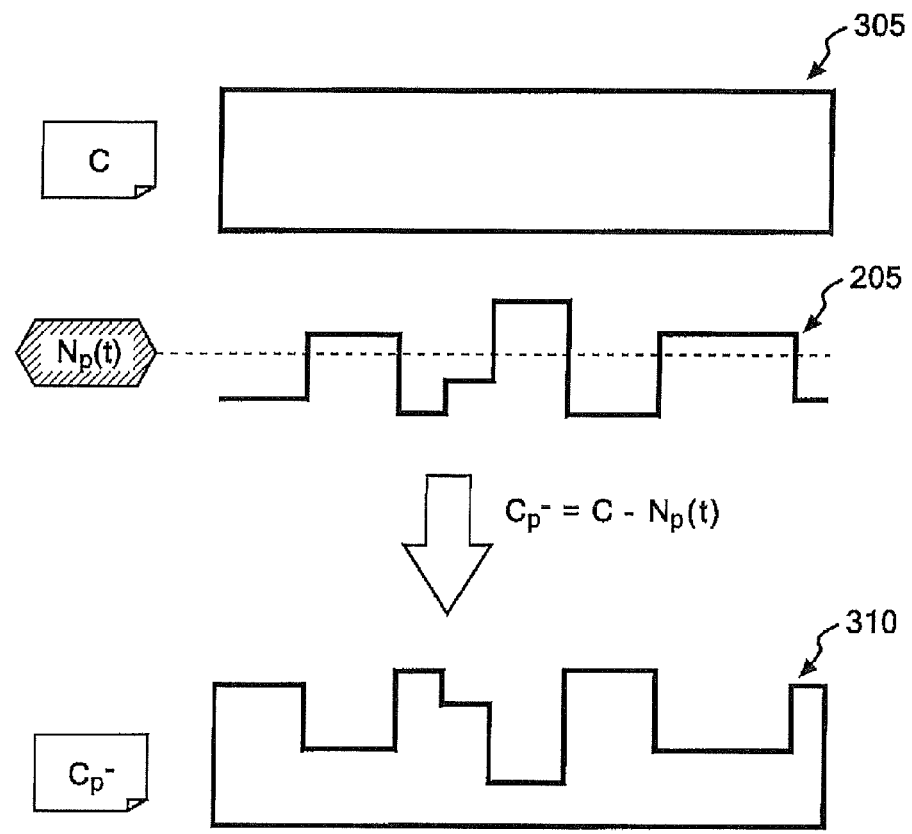
FIG. 3 is an example of an image of data to be distributed containing the embedded common noise in the embodiment of the present invention.

Then, the server embeds the common noise in the content. Data containing the embedded common noise cannot be used (played in a case of video), or is too deteriorated to be viewed even if the data could be played. FIG. 3 shows images of a to-be-distributed content containing an embedded common. FIG. 3 shows images of content C (305) before the common noise is embedded, the common noise $N_p(t)$ (205), and content $C_p$-(310) containing the embedded common noise.

Next, the content in which the common noise was embedded by the server is encrypted together with parameter $t_0$ by using a public key of each client. Distribution data is thus prepared. Upon receipt of the encrypted distribution data, each client decrypts the distribution data using its own private key and extracts parameter $t_0$. Then, the client generates a unique noise according to parameter $t_0$, and makes the content usable by using the generated unique noise.

Figure 4:
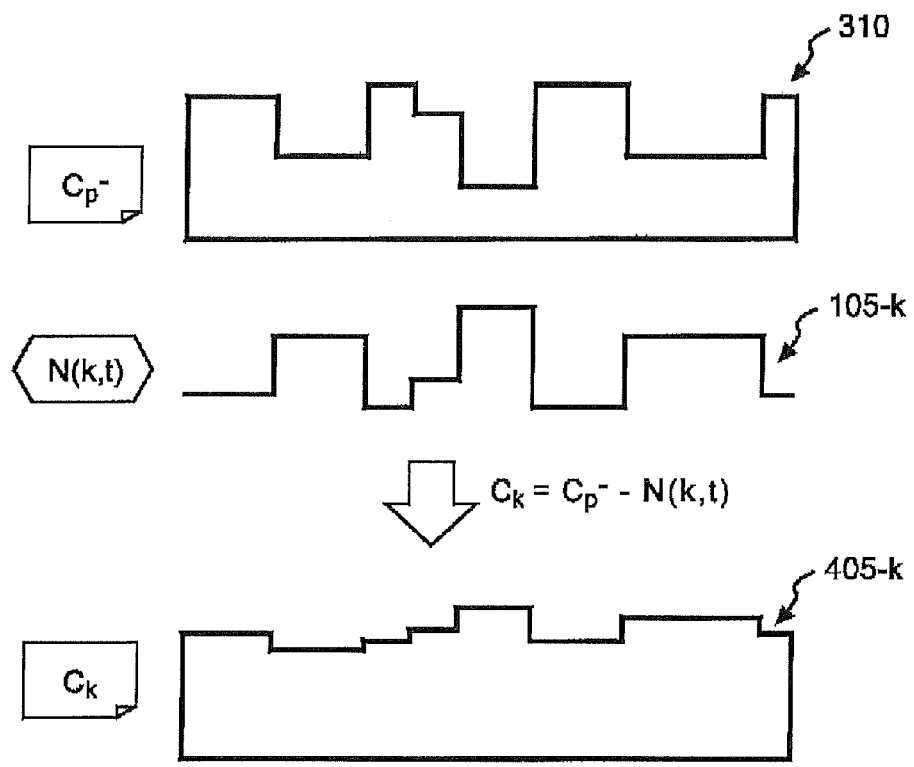
FIG. 4 is an example of an image of content made usable by the client in the embodiment of the present invention.

Here, since the common noise is generated from the unique noises of the content-receiving clients, each unique noise and the common noise are similar to, but slightly different from, each other. Accordingly, when content is made usable by a certain client using its unique noise, a difference between the common noise and the unique noise remains in the content. By this difference, the client of the content can be identified using the content made usable. FIG. 4 shows an example of images of content made usable by a client. FIG. 4 shows content $C_p$-(310) containing an embedded common noise, a unique noise N(k,t) (105-k) of a client k receiving the content, and content $C_k$ (405-k) made usable by the client k receiving the content.

As already described, the client can be identified using the difference between the unique noise and the common noise which remains in the content made usable by the client. As a result, in cases such as when a user intentionally leaks the content or when a malicious attacker steels the content, the leak route of the content can be tracked.

Figure 5:
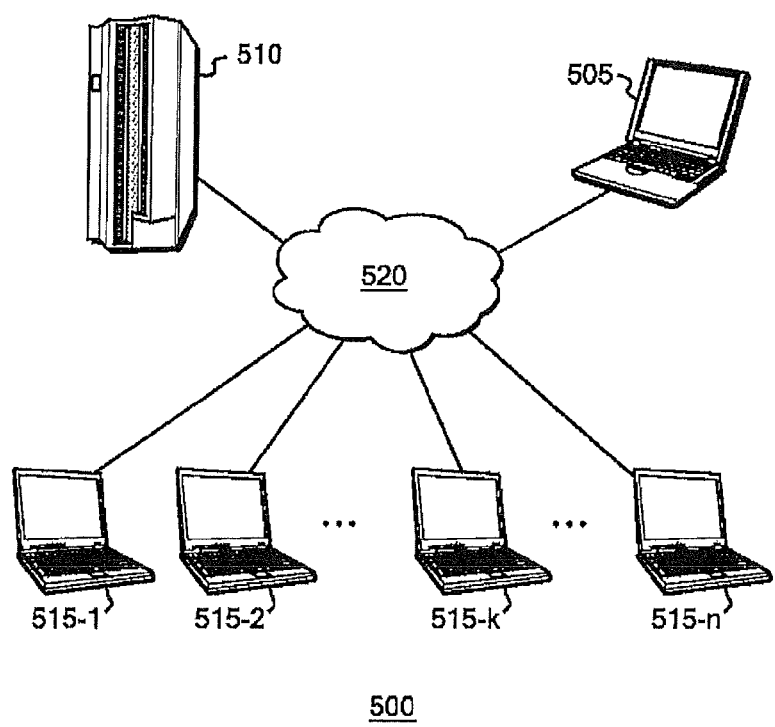
FIG. 5 is a diagram showing an example of an image of a network system in the embodiment of the present invention.

FIG. 5 is a diagram showing an example of an overview image of a network system. A network system (500) includes a computer of the creator of content (called a "creator's computer" herein) (505), a server computer which supports distribution of the content (called a "server" herein) (510), and computers of users of the content (called "clients" herein) (515-1) . . . (515-n). These computers are connected to one another via a network (520).

In an embodiment of the invention, content to be distributed is created by the creator's computer (505). The content to be distributed can be any of various data, such as documents, still images, video images, and engineering data. In some embodiments, as an example, the to-be-distributed content is data of a particular video content in MPEG format. Being standardized and widely known, MPEG format is not described in detail here. A creator uploads, to the server (510), content to be distributed from the creator's computer (505) over the network, as well as a distribution list D including information on the m clients selected t from the n clients in the system as content distribution targets.

The server (510) makes the uploaded content unusable by embedding a common noise therein. The common noise is generated according to the procedures below. First, the server (510) sets parameter $t_0$. Then, according to parameter $t_0$, the server (510) generates noises unique to respective users included in the distribution list D. The server (510) then obtains a common noise based on the generated unique noises. Specifically, the common noise is obtained through calculation of the mean of the unique noises. The server (510) returns, along with parameter $t_0$, the content containing the embedded common noise to the creator's computer (505).

The creator operates its creator's computer (505) to prepare distribution data by encrypting the returned content and parameter $t_0$ together by using a public key unique to each distribution target client. The creator holds PKI-based public keys of all the clients, and each client stores its own private key securely. Further, the size of distribution data can be reduced by encrypting the content and parameter $t_0$ using a title key ($K_t$), encrypting these content and parameter $t_0$ now using a public key of each distribution target user, and sending $K_t$ together with the data thus encrypted. Moreover, the size of the distributed data can be further reduced when the encryption with $K_t$ is performed using broadcast encryption.

Next, the creator's computer (505) sends the distribution data to the m clients included in the distribution list D. Each client receiving the distribution data decrypts the distribution data with its private key. Then, the client extracts parameter $t_0$ from the decrypted distribution data. The client generates its unique noise based on parameter $t_0$. Then, the client makes the content usable by using the unique noise. After that, the user performs work using the content thus made usable.

Figure 6:
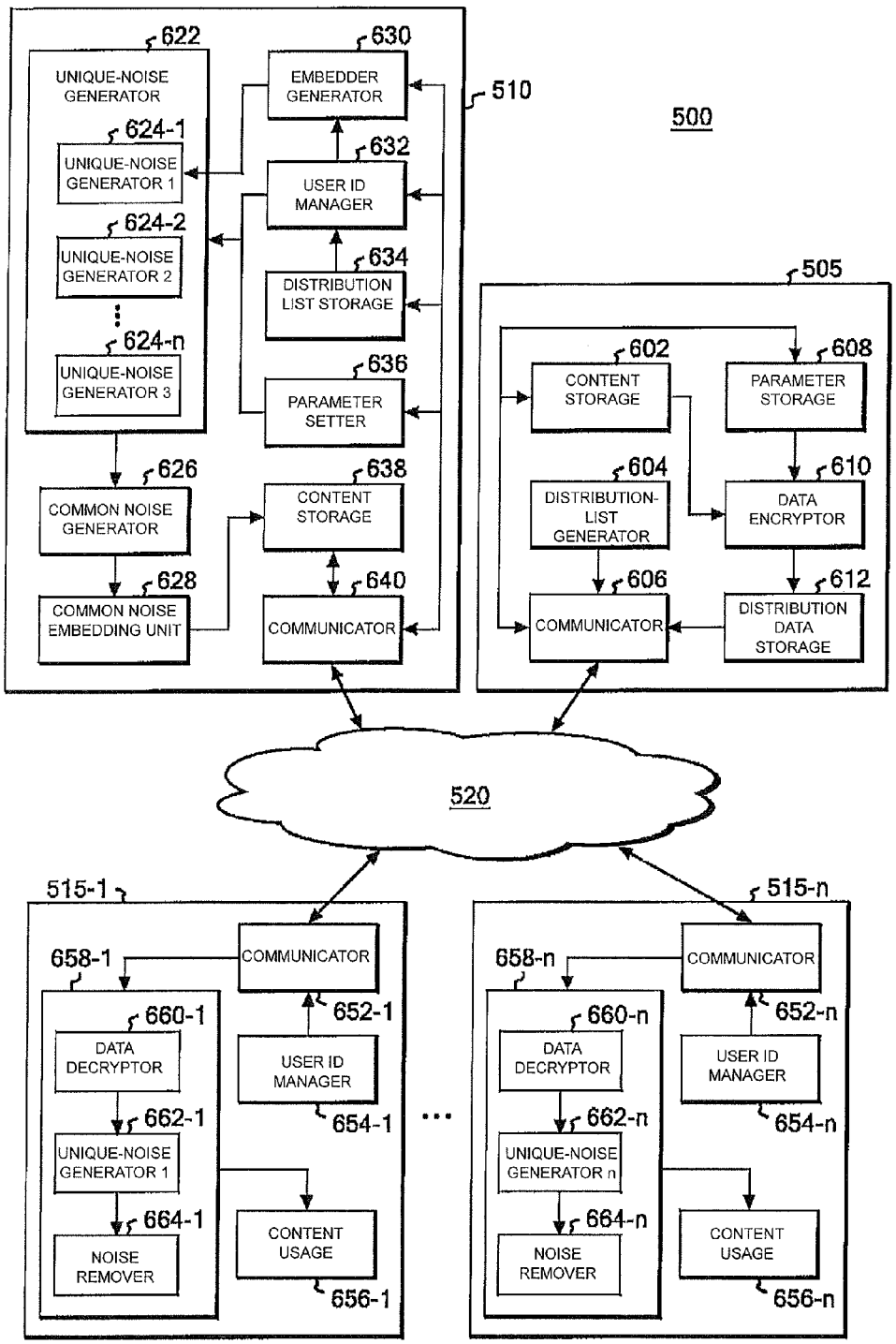
FIG. 6 is a functional block diagram of the network system in the embodiment of the present invention.

FIG. 6 is a functional block diagram of the network system (500). Note that the elements shown in the functional block diagram of FIG. 6 can be implemented by: combining a scanner device and an information processing device having a hardware configuration shown in FIG. 14 as an example; loading, onto a main memory 4, an operating system and computer programs, such as application programs, stored in a hard disk device 13 and the like; causing a CPU 1 to read the loaded operating system and computer programs; and making the hardware resources cooperate with software.

The network system (500) includes, as already described, the creator's computer (505), the server (510), and the n clients (515-1) . . . (515-n). These computers are connected to one another through the network (520).

The creator's computer (505) includes: content storage (602), a distribution-list generator (604), a communicator (606), parameter storage (608), a data encryptor (610), and a distribution data storage (612).

The content storage (602) stores data of content which is created by the creator of the content by generating or editing data. The content storage (602) also stores content in which a common noise is embedded by the server (510). The distribution-list generator (604) generates a list of clients to which the creator intends to distribute the content stored in the content storage (602).

The communicator (606) provides the creator's computer (505) with a function of performing data communication with the server (510) and the clients (515-1) . . . (515-n) through the network (520). Specifically, the communicator (606) sends the server (510) data of the content stored in the content storage (602) and the distribution list generated by the distribution-list generator (604). In addition, the communicator (606) receives, from the server (510), content in which the common noise is embedded by the server (510) and parameter $t_0$ to be described later. Moreover, the communicator (606) sends distribution data to the m clients selected from the clients (515-1) . . . (515-n) in the distribution list.

Parameter storage (608) stores parameter $t_0$ received from the server (510). The data encryptor (610) stores a public keys of each respective client and generating distribution data by encrypting, using the public key, the data of the content containing the embedded common noise and stored in the content storage (602) together with parameter $t_0$ stored in parameter storage (608). The distribution data storage (612) stores the distributed data generated by the data encryptor (610). The stored distribution data is sent, through the communicator (606), to the m clients in the distribution list selected from the clients (515-1) . . . (515-n).

The server (510) includes a unique-noise generator (622), a common-noise generator (626), a common-noise embedding unit (628), an embedder generator (630), a user ID manager (632), a distribution-list storage (634), parameter setter (636), content storage (638), and a communicator (640).

The unique-noise generator (622) includes unique-noise generators 1 to n (624-1) . . . (624-n) each of which is capable of generating a unique noise of a corresponding one of the clients (515-1) . . . (515-n), so that n unique noises are generated. The unique-noise generator (622) receives the distribution list from the creator's computer (505) and parameter $t_0$ and triggers the unique-noise generators corresponding to the m clients included in the distribution list to generate unique noises of the respective m clients. The generated unique noises are passed to the common-noise generator (626). A more specific method of generating the unique noises will be described in detail later herein.

The common-noise generator (626) generates a common noise based on the unique noises provided by the unique-noise generator (622). Specifically, the common-noise generator (626) generates a common noise by calculating the mean of the received unique noises of the respective m clients.

The common-noise embedding unit (628) embeds the common noise generated by the common-noise generator (626) in original data of the content stored in the content storage (638). The processing for common noise embedding will be described in detail later herein.

The embedder generator (630) generates, in response to a request by a user that wants to use the content, embedder software (called an "embedder" below) for using or playing the content in the user's computer. The embedder has a mechanism for generating a noise unique to each user, and therefore is different for each user. In response to generation of the embedder for the client k, the unique-noise generator k generating a unique noise N(k,t) is registered in the unique-noise generator (622).

The user ID manager (632) performs, in response to a request by the user wanting to use the content, management and authentication of the ID and password of the user. The distribution-list storage (634) stores the distribution list D including a list of clients to which the content received from the creator's computer (505) is to be distributed.

Parameter setter (636) sets particular parameters to each content to be distributed. The set parameters include parameter $t_0$. The content storage (638) stores the original data of the content received from the creator's computer (505) and the content in which the common noise is embedded by the common-noise embedding unit (628).

The communicator (640) provides the server (510) with a function of performing data communication with the creator's computer (505) and the clients (515-1) . . . (515-n) through the network (520). Specifically, the communicator (510) is capable of receiving the original data of the content and the distribution list from the creator's computer (505), and sending the creator's computer (505) the content containing the embedded common noise along with parameter $t_0$.

Next, a description is given of the clients (515-1) . . . (515-n) (herein, they are collectively called clients (515), and any one of them is called a client (515-k) or simply a "client k"). The client (515-k) includes a communicator (652-k), a user ID manager (654-k), content usage unit (656-k), and an embedder (658-k).

The communicator (652-k) provides the client (515-k) with a function of performing data communication with the creator's computer (505) and the server (510) through the network (520). Specifically, the communicator (652-k) is capable of sending a request for user ID registration to the server (510) and receiving a result of the request. The communicator (652-k) also is capable of receiving distribution data from the creator's computer (505).

The user ID manager (654-k) performs authentication of the user ID and password of the client (515-k) to the embedder (658-k). Specifically, in some embodiments, unless the user is authenticated by the user ID manager (654-k), the client (515-k) cannot access the embedder (658-k) and consequently cannot use the content.

The content usage unit (656-k) uses the content received from the creator's computer (505). For example, if the content is video, the content usage unit (656-k) provides a function for viewing the video. Note that, in some embodiments, the user can use the content with the content usage unit (656-k) only after the received distribution data is made usable by the embedder (658-k).

The embedder (658-k) includes a data decryptor (660-k), a unique-noise generator (662-k), and a noise remover (664-k). The data decryptor (660-k) securely stores a private key of the client (515-k) which forms a pair with the public key used for encryption by the data encryptor (610) of the creator's computer (505), and decrypting the distribution data using the private key. The content containing the embedded common noise and parameter $t_0$ are obtained by this decryption.

The unique-noise generator (662-k) generates the unique noise of the client (515-k) according to parameter $t_0$ received from the data decryptor (660-k). How the unique noise is generated in the client (515-k) will be described in detail later.

The noise remover (664-k) makes usable the content containing the common noise included in the distribution data, by using the unique noise provided by the unique noise generator (662-k). As already described, the common noise is obtained based on the unique noises slightly different from one another, or more specifically, by calculating the mean of the unique noises.

For this reason, the noise remover (664-k) cannot completely remove the common noise embedded in the content by using the unique noise of the client (515-k). The difference between the unique noise and the common noise which is not removed and remains is unique to each of the distribution-target clients ($515\text{-}i_1$) . . . ($515\text{-}i_m$). Further, since parameter $t_0$ is set for each content distribution, the unique noises as well as the common noise generated based on the unique noises are different for each distribution, so that the difference between the common noise and each unique noise is different for each distribution. Further, since the common noise is generated based on the unique noises of the respective m distribution-target clients, the difference between the common noise and the unique noise changes depending on the distribution-target client. Even if the content made available leaks, this uniqueness of the difference allows specifying: from which client the content leaked; by which distribution the content leaked; to which client group the leaked content was distributed; and the like. As a result, the leak route can be effectively tracked.

Figure 7:
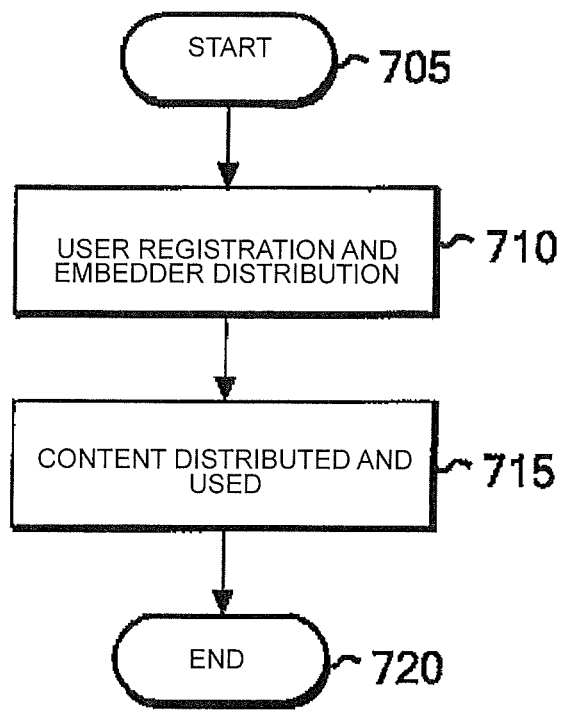
FIG. 7 is a flowchart illustrating overall operations of the network system in the embodiment of the present invention.

FIG. 7 is a flowchart (700) illustrating the overall operations of the network system. The processing starts in Step (705), and in Step (710), in response to a request by a user, user registration and distribution of an embedder to the requesting user are performed. The processing proceeds to Step (715) where content is distributed and is then used by the user, and the processing ends in Step (720). The details of Steps (710) and (715) are described below using the flowcharts in FIGS. 8 and 9, respectively.

Figure 8:
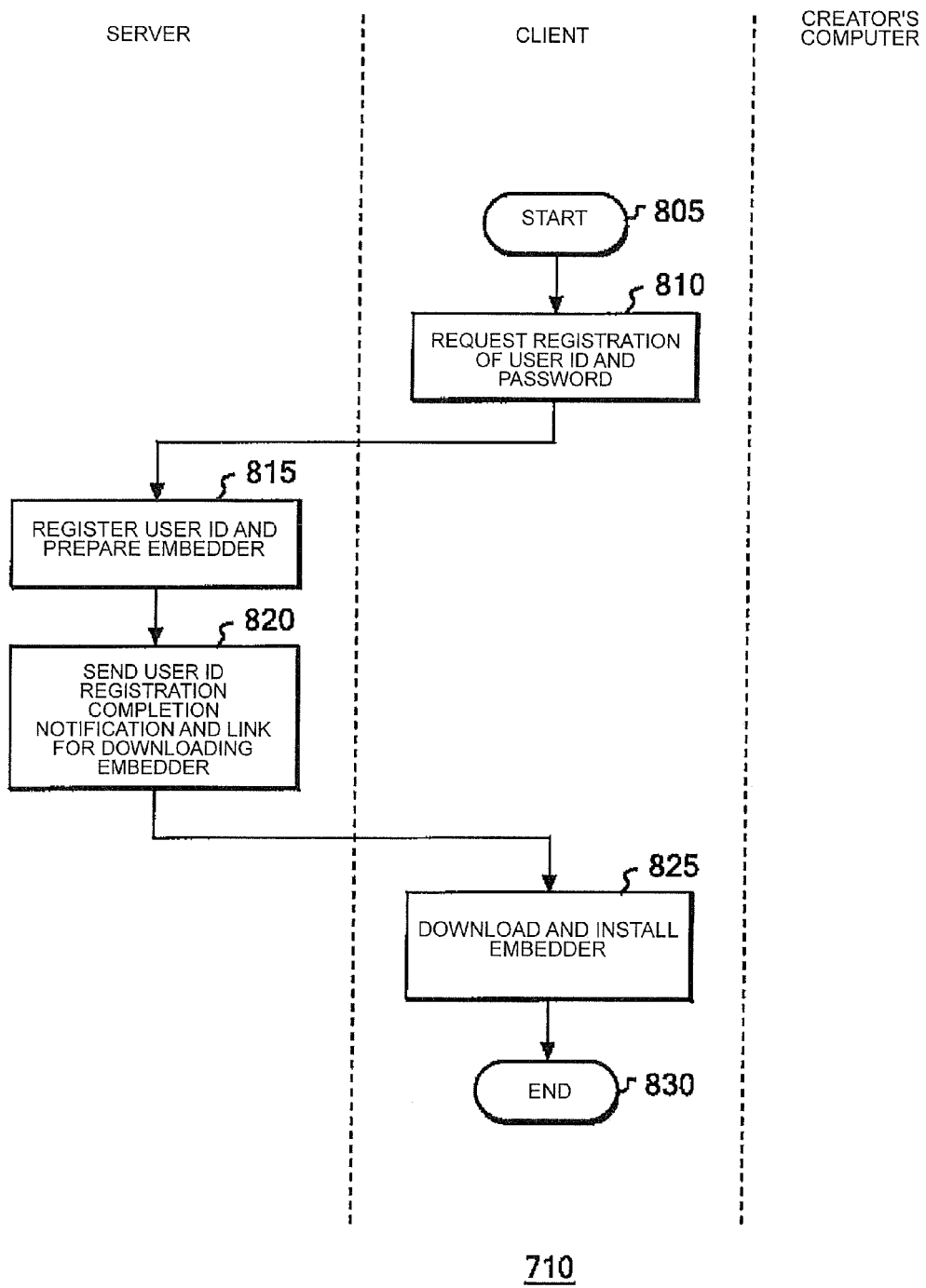
FIG. 8 is a flowchart illustrating user registration operations of the network system in the embodiment of the present invention.

Next, using a flowchart (710) in FIG. 8, a detailed description is given of an example of the user registration processing and the embedder distribution processing in Step (710) of FIG. 7. FIG. 8 is a flowchart (710) illustrating operations of the user registration processing performed in the network. The processing starts in Step (805), and in Step (810), a user's computer (i.e., a potential client) sends the server (505) a request to register a user ID and a password, namely, a user registration request. Next, in Step (815), upon receipt of the user registration request, the server (505) registers the user ID and the password, and prepares an embedder for the user.

The embedder is software which is installed on the client to provide the client computer with a function of decrypting downloaded distribution data using a private key unique to the client, a function of generating a unique noise of the client according to parameter $t_0$, a function of making content containing an embedded common noise usable using the unique noise, and the like. In some embodiments, the unique noise of the client (515-k) is generated according to the formula below.

$$N(k,t) = \alpha \text{rand}(t+s_0) + \beta \text{rand}(t+s_{1k})$$

where N(k,t) is the unique noise of client k, rand( ) is a random number generation function having very long cycle (T), t is a variable, $\alpha$ and $\beta$ are coefficients such that $\alpha > 1$ and $0 < \beta \ll 1$, and $s_0$ and $s_{1k}$ are seeds for client k.

Here, if the above calculation formula is included in the embedder as-is, a high risk is posed in view of security upon leak of the seeds of the client k, namely $s_0$, $s_{1k}$. To avoid this, in some embodiments, instead of including the formula containing the seeds $s_0$, $s_{1k}$ in the embedder, N(k,t) is obtained by the server (510) in advance, and $a_{k,j}$ satisfying the condition below is obtained and included in the embedder, and is distributed.

$$N(k, t) = \sum_{j=0}^{T-1} a_{k,j} t^j$$

This $a_{k,j}$ can be obtained by executing the following matrix operations.

$$\begin{bmatrix} a_{k,0} \\ a_{k,1} \\ \vdots \\ a_{k,v} \\ \vdots \\ a_{k,T-1} \end{bmatrix} = \begin{bmatrix} 1 & 0 & \ldots & 0 & \ldots & 0 \\ 1^0 & 1^1 & \ldots & 1^v & \ldots & 1^{T-1} \\ \vdots & \vdots & \ddots & \vdots & \ddots & \vdots \\ u^0 & u^1 & \ldots & u^v & \ldots & u^{T-1} \\ \vdots & \vdots & \ddots & \vdots & \ddots & \vdots \\ (T-1)^0 & (T-1)^1 & \ldots & (T-1)^v & \ldots & (T-1)^{T-1} \end{bmatrix}^{-1} \begin{bmatrix} N(k, 0) \\ N(k, 1) \\ \vdots \\ N(k, u) \\ \vdots \\ N(k, T-1) \end{bmatrix}$$

Next, in response to completion of the preparation of the embedder for the requesting user in Step (815), the processing proceeds to Step (820) where the server (510) sends the user a user ID registration completion notification including a link (URL) for downloading the embedder.

Next, in Step (825), using the client (515-k) having received the notification, the user clicks the embedder download URL included in the user ID registration completion notification to download and install the embedder. The processing proceeds to Step (830) and ends.

Figure 9:
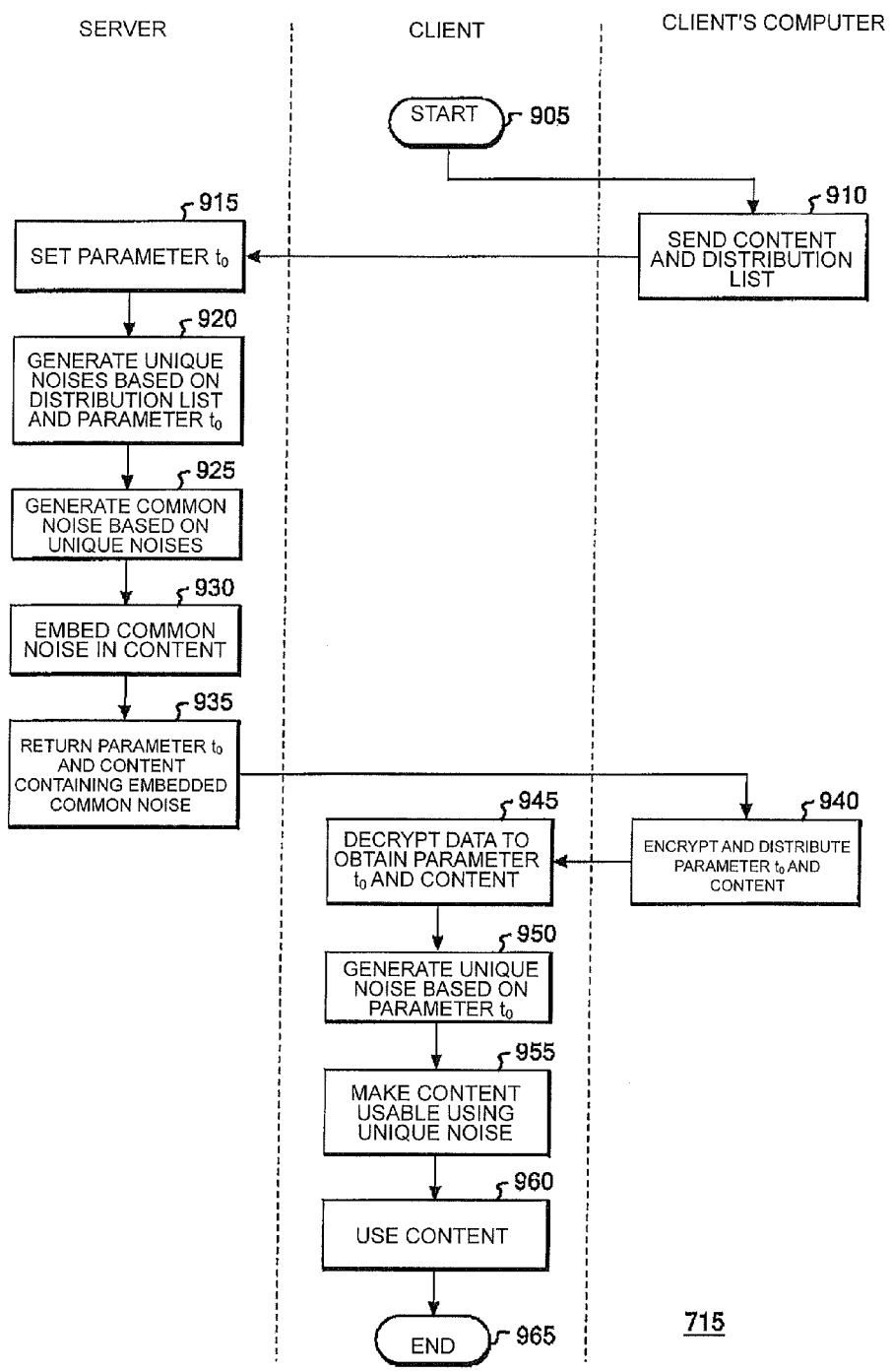
FIG. 9 is a flowchart illustrating data distribution operations of the network system in the embodiment of the present invention.

Next, using a flowchart (715) in FIG. 9, an example of the content distribution processing in Step (715) in FIG. 7 is described in detail. FIG. 9 is a flowchart (715) illustrating operations of the data distribution processing performed in the network system. The processing starts in Step (905), and in Step (910), the content prepared by its creator is uploaded from the creator's computer (505) to the server (510), along with a distribution list including clients requesting distribution of the content.

Next, in Step (915), upon receipt of the content, the server (510) sets parameter $t_0$. Parameter $t_0$ can be set so that, for example, a minimum difference A may be maximized according to the following formula:

$$t_0 = \arg \max_t A(t, \Delta t)$$

where $$A(t, \Delta t) = \min_{p,q \in D, p \neq q} \int_t^{t+\Delta t} (N(p, t) - N(q, t)) dt$$

where A is a minimum difference, t is a variable, $\Delta t$ is the length in number of cycles) of noise necessary for embedding in content to be distributed, D is a set of clients included in distribution list, p,q is any combination of members in D, and N(q,t) is the unique noise of client k.

It should be noted that when parameter $t_0$ is set so that the minimum difference A may be maximized, the difference between the common noise and the unique noise which remains in the content after the common noise embedding (and which is used to specify the client that leaked the content) can be differentiated between the clients more clearly.

The processing proceeds to Step (920) where the server (510) generates, based on parameter $t_0$, a unique noise N(k,t) of each client included in the received distribution list D. As already described, the unique noise of the client k is generated according to the following formula:

$$N(k,t) = \alpha \text{rand}(t+s_o) + \beta \text{rand}(t+s_{1k})$$

where N(k,t) is the unique noise of client k, rand( ) is a random number generation function having very long cycle (T), t is a variable, $\alpha$ and $\beta$ are coefficients such that $\alpha > 1$ and $0 < \beta \ll 1$, and $s_0$ and $s_{1k}$ are seeds for client k.

Next, in Step (925), a common noise Np(t) is generated based on the unique noises generated in Step (920). The common noise is generated by calculating the mean of the unique noises, or more specifically, according to the formula below.

$$Np(t) = \frac{1}{m} \sum_{j=1}^{m} N(i_j, t)$$

where Np(t) is common noise, m is the number of distribution-target clients, N(k,t) is the unique noise of client k, are clients included in the distribution list (j=1 . . . m), and t is a variable.

The processing proceeds to Step (930) where the server (510) embeds the common noise Np(t) generated in Step (925) in the content. It should be noted again that since the content containing the embedded common noise is scrambled, the distribution-target client cannot use the content without descrambling it.

Figure 10:
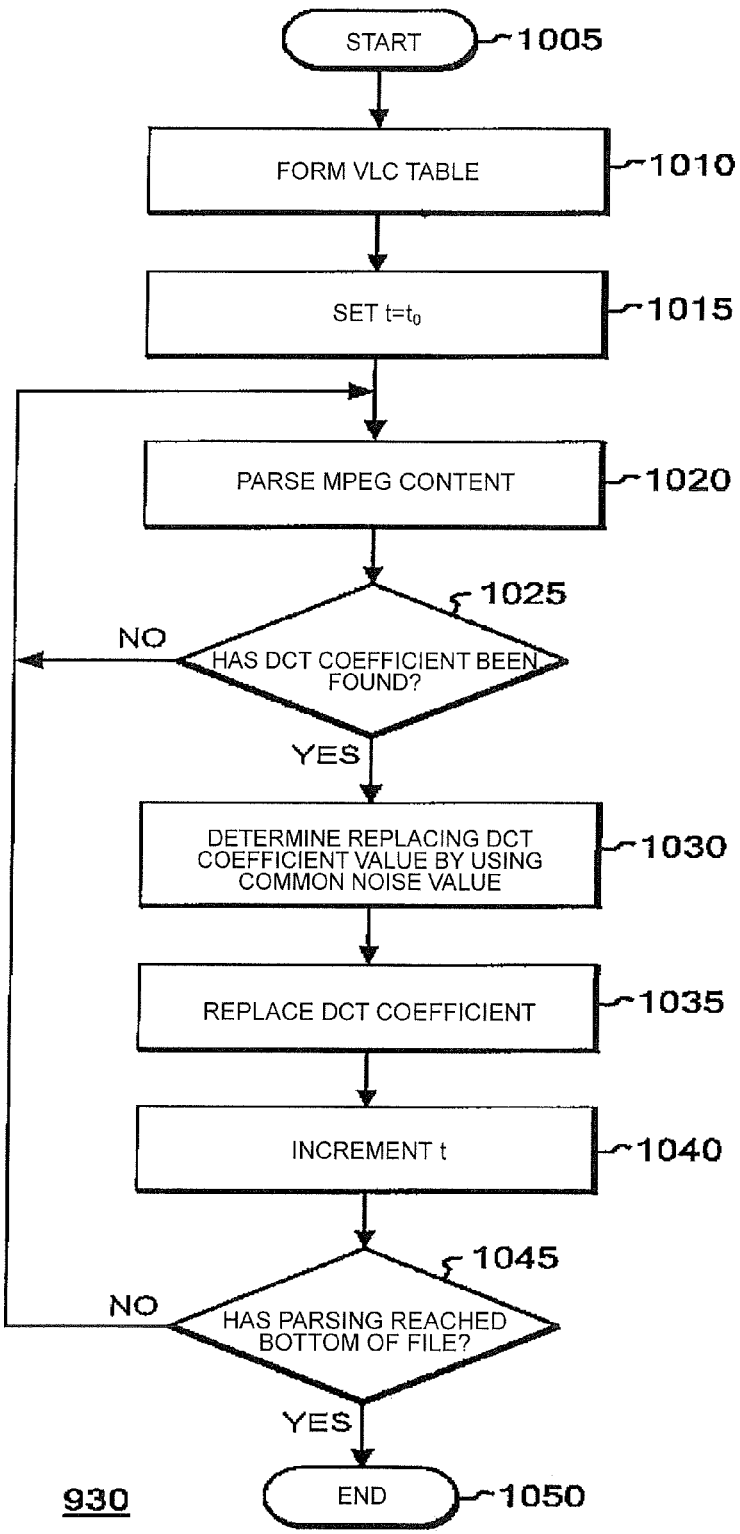
FIG. 10 is a flowchart illustrating operations of an example of noise embedding processing in the embodiment of the present invention.
Figure 11:
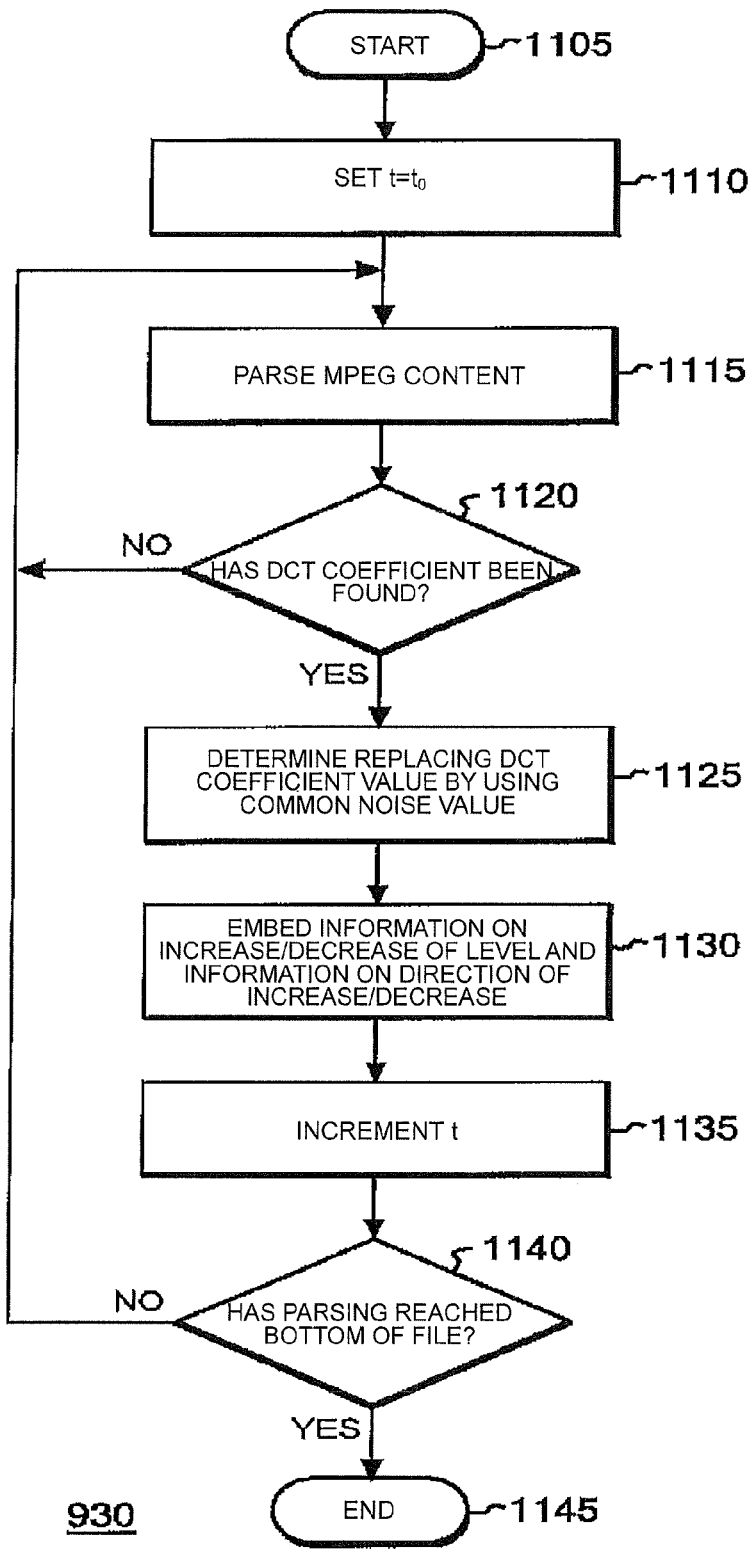
FIG. 11 is a flowchart illustrating operations of another example of the noise embedding processing in the embodiment of the present invention.

Now, two examples of the common noise embedding processing in Step (930) are described using FIGS. 10 and 11. FIG. 10 is a flowchart illustrating operations of one of the examples of the noise embedding. In the noise embedding processing of this example, the common noise is embedded in discrete cosine transform (DCT) coefficients within content in MPEG format.

In MPEG content, for the DCT coefficients, combinations of the run-length of zero coefficients (RUN), the level of a nonzero coefficient following RUN (LEVEL), and a sign indicating whether LEVEL is positive or negative (SIGN) are coded using a normalized variable-length code (VLC) technique. In this example, the noise embedding processing is implemented by performing replacement according to a map based on the common noise, within a set of VLCs having the same length among VLCs having various lengths.

The processing starts in Step (1005), and in Step (1010), a table is formed, in which a set of VLCs having the same length are labeled. Specifically, the VLCs having the same length are sorted according to size or the order in MPEG standards, and are labeled from 0. A table of 7-bit-long VLCs is shown below as an example. In some embodiments, such a table is formed for each bit-length of the VLCs. This table is shared by the server and all of the clients.

TABLE 1

| Label | VLC |
|---|---|
| 0 | 0001000 |
| 1 | 0001001 |
| 2 | 0001010 |
| 3 | 0001011 |
| 4 | 0001100 |
| 5 | 0001101 |
| 6 | 0001110 |
| 7 | 0001111 |

The processing proceeds to Step (1015) where parameter $t_0$ is set to a variable t. Next, in Step (1020), the MPEG content to be distributed is parsed from the top of the file.

The processing proceeds to Step (1025) where it is determined whether a DCT coefficient has been found or not. When it is determined in Step (1025) that no DCT coefficient has been found, the processing proceeds, through the arrow NO, back to Step (1020) to continue the parsing of the content. When it is determined in Step (1025) that a DCT coefficient has been found, the processing proceeds, through the arrow YES, to Step (1030) where a replacing DCT coefficient is determined according to the formula below using the common noise value.

$$L'=(L-N_p(t)) \bmod c$$

where L' is the label corresponding to VLC after replacement, L is the label corresponding to VLC before replacement, $N_p(t)$ is common noise, and c is a number of members in set of VLCs having certain length.

The processing proceeds to Step (1035) where the DCT coefficient is replaced by the DCT coefficient value determined in Step (1030), and t is incremented in Step (1040). The processing proceeds to Step (1045) where it is determined whether the parsing of the content has reached the bottom of the file or not. When it is determined that the parsing has not reached the bottom, the processing proceeds, through the arrow NO, to Step (1020) to continue the parsing of the content. When it is determined that the parsing has reached the bottom, the processing proceeds, through the arrow YES, to Step (1050) and ends.

Next, the other example of the common noise embedding processing is described. FIG. 11 is a flowchart illustrating operations of the other example of the noise embedding processing. In this example, as in the first example, a common noise is embedded in the DCT coefficients within MPEG content. What is different from the first example is that the common noise is embedded by not changing the run-length of zero coefficients (RUN), but changing, based on the common noise, only a combination of the size (always positive) of the level of a nonzero coefficient following RUN and a sign indicating whether LEVEL is positive or negative (SIGN).

The processing starts in Step (1105), and parameter $t_0$ is set to the variable t in Step (1110). Then, in Step (1115), the MPEG content to be distributed is parsed from the top of the file.

The processing proceeds to Step (1120) where it is determined whether a DCT coefficient has been found or not. When it is determined in Step (1120) that no DCT coefficient has been found, the processing proceeds, through the arrow NO, back to Step (1115) to continue the parsing of the content. When it is determined in Step (1120) that a DCT coefficient has been found, the processing proceeds, through the arrow YES, to Step (1125) where the value of a replacing DCT coefficient (specifically; LEVEL, SIGN, and BitDir that determines a direction of an increase or decrease of the LEVEL value by the common noise) is determined using the common noise value. Here, the LEVEL value with a positive/negative sign obtained from a combination of LEVEL and SIGN is represented by SLEVEL.

In Step (1125), to reduce the volume of data after replacement, BitDir is determined so that the absolute value of the LEVEL value may be decreased by the common noise. To be more specific, for a certain variable t, (a) when the value of SLEVEL is positive and the value of the common noise is positive, BitDir is set in the reverse direction (−1), (b) when the value of SLEVEL is positive and the value of the common noise is negative, BitDir is set in the forward direction (+1), (c) when the value of SLEVEL is negative and the value of the common noise is positive, BitDir is set in the forward direction (+1), and (d) when the value of SLEVEL is negative and the value of the common noise is negative, BitDir is set in the reverse direction (−1).

When BitDir is determined, SLEVEL' is calculated according to the formula below, replacing LEVEL and SIGN values are determined based on the calculated SLEVEL'.

$$SLEVEL'=SLEVEL-((N_p(t)*BitDir) \bmod rn[run])$$

if (SLEVEL>0&&SLEVEL'≤0){SLEVEL'= SLEVEL'=1} else if (SLEVEL<0&&SLEVEL'≥0){SLEVEL'= SLEVEL'+1} where SLEVEL' is the LEVEL after replacement with positive or negative sign, SLEVEL is the LEVEL with positive or negative sign before replacement, $N_p(t)$ is the common noise, BitDir is a value that determines direction of increase or decrease of LEVEL by common noise ("+1" or "−1"), and rn[run] is a value preset according to number of RUNs It should be noted that, in the above formula, the common noise is calculated by mod of the value (rn[run]) preset according to the number of run-lengths of zero coefficients (RUNS) in order to prevent that, when the common noise is embedded, the absolute value of LEVEL exceeds an acceptable value or the size of the data becomes unnecessarily large.

It should be further noted that (a) when SLEVEL is positive and SLEVEL' is 0 or smaller, SLEVEL' is further decreased by 1 and (b) when SLEVEL is negative and SLEVEL' is 0 or larger, SLEVEL' is further increased by 1, in order to prevent that the value of LEVEL after the common noise is embedded becomes 0 to clear RUN.

The processing proceeds to Step (1130) where the content is changed using the replacing LEVEL and SIGN values determined in Step (1125), and then BitDir is embedded in the content. Before BitDir is embedded in the content, "−1" and "+1" in BitDir are converted to "+1" and "0," respectively, to prevent an increase in data volume as much as possible.

Next, in Step (1135), the variable t is incremented. The processing proceeds to Step (1140) where it is determined whether the parsing of the content has reached the bottom of the file or not. When it is determined that the parsing has not reached the bottom, the processing proceeds, through the arrow NO, back to Step (1115) to continue the parsing of the content. When it is determined that the parsing has reached the bottom, the processing proceeds, through the arrow YES, to Step (1145) and ends.

Turning back to the flowchart (715) of FIG. 9, the content in which the common noise was embedded in Step (935) is sent back to the creator's computer (505), along with parameter $t_0$. Next, in Step (940), the content and parameter $t_0$ thus sent back are encrypted using the public key of each user, and distributed to each user.

In Step (945), the client decrypts the received data using its private key, to obtain the content containing the embedded common noise as well as parameter $t_0$. Next, in Step (950), based on the extracted common parameter $t_0$, the client generates its unique noise. Generation of the unique noise has already been described. Note that the embedder installed to each client cannot generate unique noises of other clients.

The processing proceeds to Step (955) where the client makes the content usable by using the unique noise generated in Step (950). Here, it should be noted that the content is made usable but is not completely reconstructed due to the slight difference between the unique noise and the common noise, and the content made usable has identification information unique to the user of the content.

Figure 12:
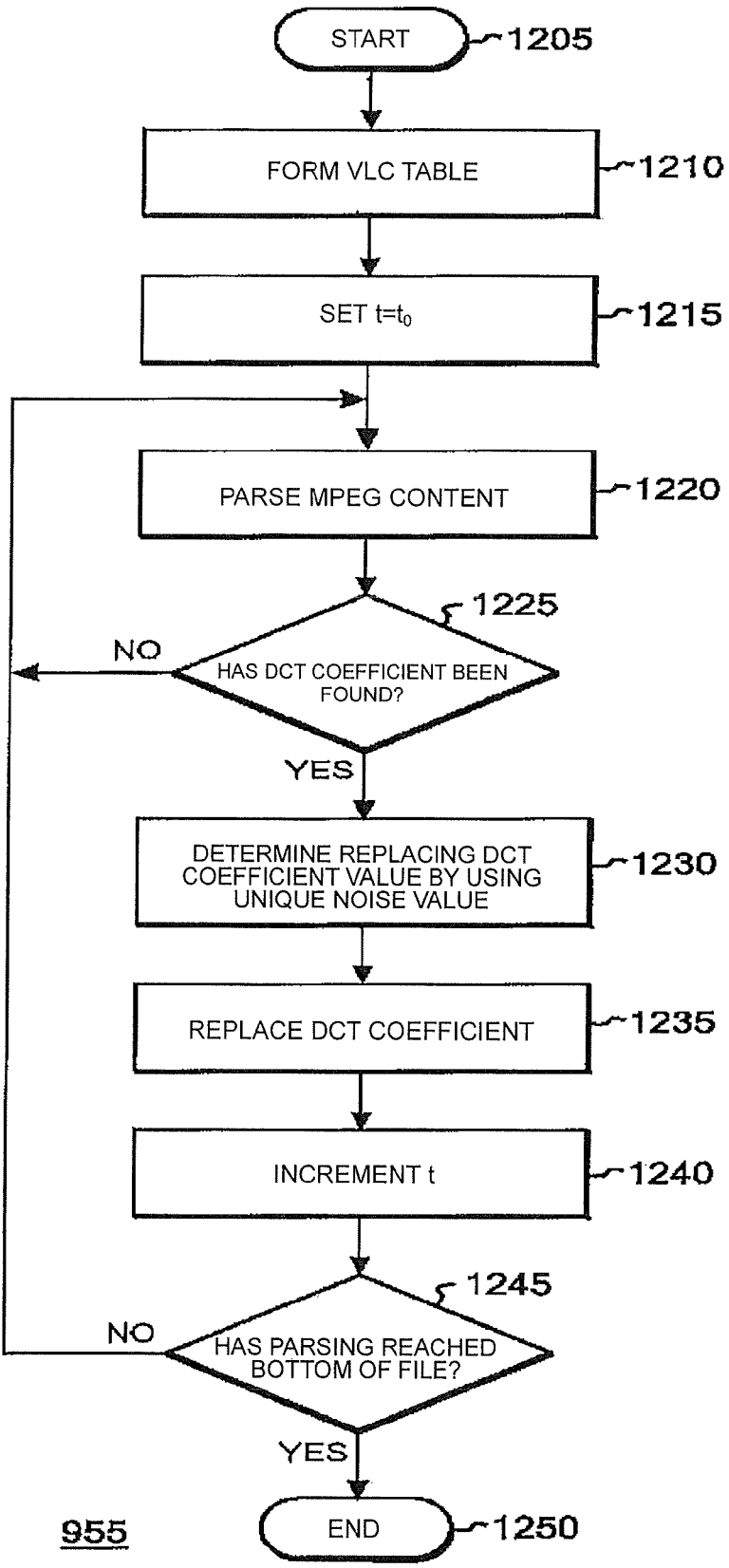
FIG. 12 is a flowchart illustrating operations of an example of noise removal processing in the embodiment of the present invention.
Figure 13:
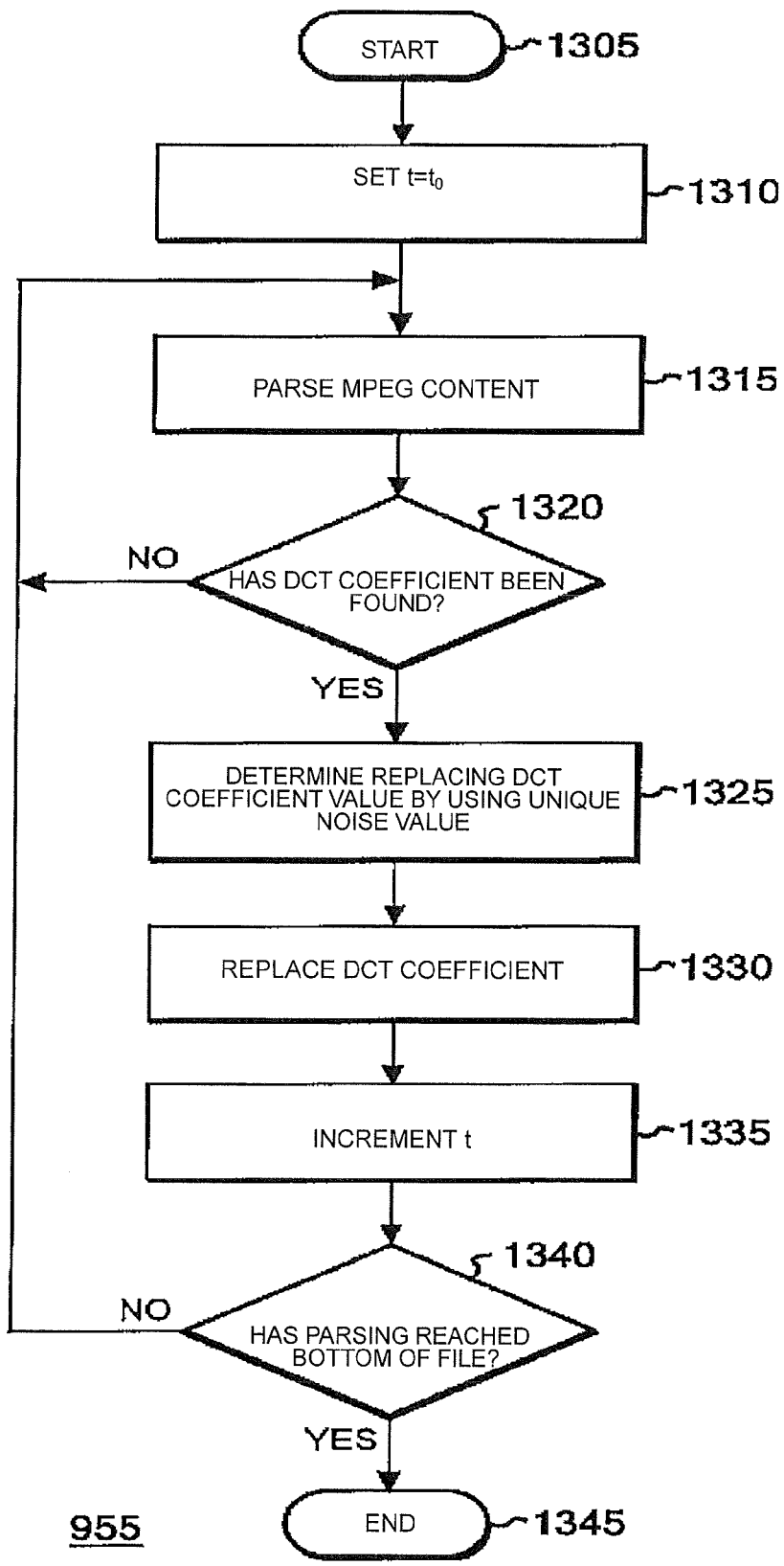
FIG. 13 is a flowchart illustrating operations of another example of the noise removal processing in the embodiment of the present invention.

Here, two examples of the noise removal processing in Step (930) are described using FIGS. 12 and 13. FIG. 12 is a flowchart (955) illustrating operations of one of the examples of the noise removal. This processing corresponds to the common noise embedding processing described in connection with FIG. 10. The processing starts in Step (1205), and in Step (1210), a VLC table is created by the client. This creation of the VLC table has been described in connection with FIG. 10, and is therefore not described in detail here.

The processing proceeds to Step (1215) where parameter $t_0$ is set to the variable t. Next, in Step (1220), the content in MPEG format to be distributed is parsed from the top of the file.

The processing proceeds to step (1225) where it is determined whether a DCT coefficient has been found or not. When it is determined in Step (1225) that no DCT coefficient has been found, the processing proceeds, through the arrow NO, back to Step (1220) to continue the parsing of the content. When it is determined in Step (1225) that a DCT coefficient has been found, the processing proceeds, through the arrow YES, to Step (1230) where a replacing DCT coefficient is determined according to the formula below using the unique noise value. This determination involves reversal processing of the determination described in FIG. 10, except for using the unique noise value instead of the common noise value. Specifically, if the common noise was embedded according to the first example described above, a label is computed according to the formula below, and the DCT coefficient is replaced by a corresponding VLC.

$$L'=(L+N(k,t)) \bmod c$$

where L' is a label of VLC after replacement, L is a label of VLC before replacement, $N(k,t)$ is the unique noise of client k, and c is a number of members in set of VLCs having certain length.

The processing proceeds to Step (1235) where the DCT coefficient is replaced by the replacing DCT coefficient value determined in Step (1230), and the variable t is then incremented in Step (1240). The processing proceeds to Step (1245) where it is determined whether the content parsing has reached the bottom of the file or not. When it is determined that the parsing has not reached the bottom of the file, the processing proceeds, through the arrow NO, back to Step (1220) to continue the parsing of the content. When it is determined that the parsing has reached the bottom of the file, the processing proceeds, through the arrow YES, to Step (1250) and ends.

Next, the other example of the noise removal processing is described. FIG. 13 is a flowchart (955) illustrating operations of the other example of the noise removal processing. This processing corresponds to the common noise embedding processing described in connection with FIG. 11. The processing starts in Step (1305), and in Step (1310), parameter $t_0$ is set to the variable t. Then in Step (1315), the content in MPEG format to be distributed is parsed from the top of the file.

The processing proceeds to Step (1320) where it is determined whether a DCT coefficient has been found or not. If it is determined in Step (1320) that no DCT coefficient has been found, the processing proceeds, through the arrow NO, back to Step (1315) to continue the parsing of the content. If it is determined in Step (1320) that the DCT coefficient has been found, the processing proceeds, through the arrow YES, to Step (1325) where corresponding BitDir is first extracted, and SLEVEL' is computed according to the formula below using the unique noise value. Then, based on the computed SLEVEL', replacing LEVEL and SIGN values are determined $$SLEVEL'=SLEVEL+((N(k,t)*BitDir) \bmod m[\text{run}])$$

if (SLEVEL>0&&SLEVEL'≤0) {SLEVEL'=SLEVEL'−1}
else if (SLEVEL<0&&SLEVEL'≥0){SLEVEL'=SLEVEL'+1} where SLEVEL' is the LEVEL after replacement with positive or negative sign, SLEVEL is the LEVEL before replacement with positive or negative sign, $N(k,t)$ is the unique noise of client k, BitDir is a value that determines direction of increase or decrease of LEVEL by common noise ("+1" or "−1"), and m[run] is a value preset according to number of RUNs.

The processing proceeds to Step (1330) where the DCT coefficient is replaced by the determined LEVEL and SIGN values. Then, the variable t is incremented in Step (1335). The processing proceeds to Step (1340) where it is determined whether the parsing of the content has reached the bottom of the file or not. When it is determined that the content parsing has not reached the bottom of the file, the processing proceeds, through the arrow NO, back to Step (1315) to continue the parsing of the content. When it is determined that the parsing of the content has reached the bottom of the file, the processing proceeds, through the arrow YES, to Step (1345) and ends.

Turning back to the flowchart (715) of FIG. 9, the user uses the content in Step (960), and the processing ends in Step (965).

Figure 14:
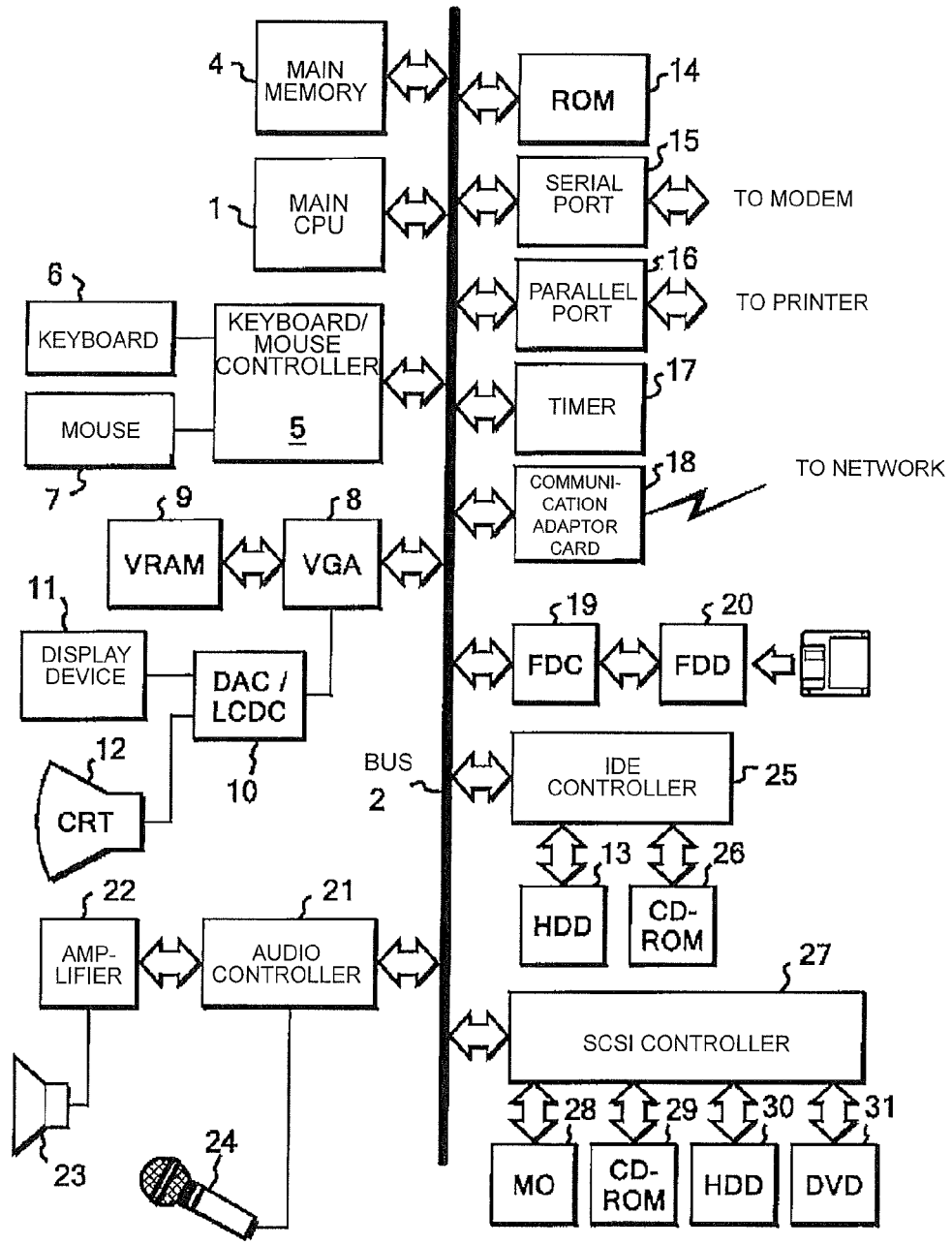
FIG. 14 is a diagram showing an example of a hardware configuration of an information processing apparatus preferred to implement the constituents of the network system in the embodiment of the present invention.

FIG. 14 is a diagram showing an example of a hardware configuration of an information processing apparatus preferable to implement the creator's computer 505, the server 510, and the clients (515-1) . . . (515-n). The information processing apparatus includes the central processing unit (CPU) 1 and the main memory 4 which are connected to a bus 2. Hard disk devices 13 and 30 and removable storages (external storage systems in which recording media are replaceable) such as CD-ROM devices 26 and 29, a flexible disk device 20, an MO device 28, and a DVD device 31 are connected to the bus 2 via a floppy disk controller 19, an IDE controller 25, an SCSI controller 27, and the like.

Recording media such as a flexible disk, an MO, a CD-ROM, and a DVD-ROM are inserted to the corresponding removable storages. These recording media, the hard disk devices 13 and 30, and the ROM 14 can store codes of computer programs for instructing the CPU and the like in cooperation with an operating system to carry out embodiments of the invention. The computer programs are executed by being loaded to the main memory 4. The computer programs can be compressed or split to be recorded in multiple media.

The information processing apparatus receives input from input devices such as a keyboard 6 or a mouse 7 through a keyboard/mouse controller 5. Through a DAC/LCDC 10, the information processing apparatus is connected to a display device 11 for presenting visual data to a user.

The information processing apparatus can communicate with other computers and the like by being connected to a network through a network adapter 18 (e.g., an Ethernet (R) card or a Token Ring card) or the like. The information processing apparatus can also be connected to a printer via a parallel port or to a modem through a serial port, although they are not shown.

It should be easily understood by the above description that the information processing apparatus preferable to implement a data processing system according to an embodiment of the invention is implemented by an information processing apparatus such as a regular personal computer, a work station, a main frame, or a combination of these. Note that these constituents are shown as mere examples, and not all of them are requisite for embodiments of the invention.

It is of course easily conceivable by those skilled in the art that the elements of the hardware configuration of the information processing apparatus used in embodiments of the invention can be variously modified such that, for example, multiple machines are combined and each machine is allocated a function. Naturally, such modifications are included in embodiments of the invention.

The data processing system of an embodiment of the invention employs the Windows® operating system provided by Microsoft Corporation, the MacOS® provided by Apple Computer Incorporated, and an operating system which supports a multi-window environment of a graphic user interface (GUI), such as the UNIX® system (e.g., AIX® provided by International Business Machines Corporation) including X Window System.

It can be understood from the above description that the data processing system used in embodiments of the invention is not limited to a particular multi-window operating system environment.

Moreover, embodiments of the invention can be implemented as hardware, software, or a combination of both. A typical example of the implementation by the combination of hardware and software is implementation by a data processing system having a predetermined program. In this case, by being loaded to and executed by the data processing system, the predetermined program controls the data processing system and implements the processing according to embodiments of the invention. This program is configured of a group of commands expressible in any language, code, or notation. Such a group of commands allow the system to execute a particular function directly or after the group of commands is 1. converted to another language, code, or notation, and/or 2. copied to a medium.

It is a matter of course that the embodiments of the invention include not only such a program, but also the medium recording the program. The program for implementing the functions of embodiments of the invention can be stored in any computer-readable recording medium, such as a flexible disk, an MO, a CD-ROM, a DVD, a hard disk device, a ROM, an MRAM, or a RAM. This program can be stored in a recording medium by being downloaded from another data processing system to which the data processing system is connected via a communication line, or by being copied from another recording medium. Further, this program can also be compressed or divided and stored in a single or multiple storage media. It should be noted that a program product for implementing embodiments of the invention can of course be provided in various forms.

It is clear to those skilled in the art that various modifications and improvements can be made to the embodiments described above. For example, in some embodiments, the common noise is embedded in the discrete cosine transform (DCT) coefficients which are the AC components of video content in MPEG format. Of course, alternatively, noise can also be embedded in DC components, macroblock patterns, motion vectors, or the like.

Further, in a case of video content, the image quality and the signal intensity sometimes need to undergo time-dependent adjustment. In such a case, for example, a multiplication r(t) of signal intensity that the creator of the content wants is set to the variable t, and a common noise amplified or damped by r(t) is embedded by the server (510). Then, r(t) is sent to the client along with parameter $t_0$, and the client makes the content usable by using the unique noise amplified or damped with r(t).

In an embodiment of the invention, $a_{k,j}$ of every j (j=0 . . . T−1) is embedded in the embedder of the client k. However, it is sometimes difficult to include $a_{k,j}$ of all the m clients in the embedder and distribute the embedder to the client k when the cycle (T) of the unique noise is extremely large. In such a case, the following method may be employed. Specifically, a unique noise N(k,t) is calculated by discretely selecting the value of j, and the unique noise N(k,t) is approximated by including $a_{k,j}$ corresponding to the selected j in the embedder. Note that, when this method is employed, it is preferable that j's that yield extremum should not be skipped.

In addition, although video content is distributed in embodiments of the invention described above, it should be noted that the embodiments of the invention are, clearly, applicable to various types of data, such as video data in a different format, still-image data, engineering data, and document data. Naturally, the technical scope of the embodiments of the invention includes forms having modifications or improvements described above.

According to embodiments of the invention, an increase in the size of data to be distributed can be suppressed as much as possible. Moreover, a common noise is generated from the unique noises of distribution-target clients, or more specifically, by calculating the mean of the unique noises of the distribution-target clients. Accordingly, data can be distributed in such a manner as to allow an attacker to be effectively tracked while minimizing interruption of usage of the content.

The invention claimed is:

1. A method for distributing data to a plurality of clients from a server, the method comprising the steps of:
generating a common noise, the common noise being based on noises unique to respective ones of the plurality of clients;
embedding the common noise in the data to be distributed to the plurality of clients to make the data unusable; and
distributing the data containing the embedded common noise to the plurality of clients, so that the data containing the embedded common noise is made usable by each of the plurality of clients using a unique noise generated in the client;
wherein the unique noise is generated according to a given parameter; and
wherein the distributing step includes a step of sending the parameter, and the data containing the embedded common noise is made usable by each of the clients using the unique noise generated according to the parameter received by the client.

2. The method according to claim 1, wherein the unique noise is a synthesis of a first noise and a second noise, the first noise having a larger amplitude than the second noise.

3. The method according to claim 1, wherein the unique noise N(k,t) of a client k which is one of the plurality of clients is obtained according to the following formula:

$$N(k,t)=\alpha \text{rand}(t+s_0)+\beta \text{rand}(t+s_{1k})$$

where N(k,t) is the unique noise of client k, rand( ) is random number generation function having very long cycle (T), t is a variable, $\alpha$ and $\beta$ are coefficients such that $\alpha>1$ and $0<\beta\ll1$, and $s_0$ and $s_{1k}$ are seeds for client k.

4. The method according to claim 1, wherein when the parameter is $t_0$, the parameter $t_0$ is obtained according to the following formula:

$$t_0 = \arg\max A(t, \Delta t)$$

where $$A(t, \Delta t) = \min_{p,q\in D, p\neq q} \int_t^{t+\Delta t} (N(p,t) - N(q,t))\,dt$$

where A is a minimum difference, t is a variable, $\Delta t$ is the length in number of cycles) of noise necessary for embedding in content to be distributed, D is a set of clients included in distribution list, p,q is any combination of members in D, and N(q,t) is the unique noise of client k.

5. The method according to claim 1, wherein distribution data including the parameter and the data containing the embedded common noise is sent to each of the plurality of distribution-target clients, the distribution data encrypted by using an encryption key unique to the client, and wherein each of the clients is provided with the parameter by decrypting the distribution data using a decryption key unique to the client.

6. The method according to claim 1, wherein the generating step includes a step of calculating the mean of the unique noises of the plurality of clients, respectively.

7. The method according to claim 1, wherein the server includes a mechanism for generating the unique noises of all the plurality of clients, and each of the plurality of clients includes a mechanism for generating its own unique noise.

8. The method according to claim 1, wherein the data includes a variable-length code (VLC) portion, and the embedding step includes a step of changing the VLC portion included in the data based on the common noise.

9. The method according to claim 8, wherein the changing step includes the steps of:
determining a map generated based on the common noise for a set of VLCs having an equal length; and
replacing a VLC in the data according to the map.

10. The method according to claim 9, further comprising the steps of:
labeling members included in the set of equal-length codes; and
replacing a given VLC portion with a VLC corresponding to a label after replacement calculated according to the following formula:

$$L'=(L-N_p(t))\bmod c$$

where L' is the label corresponding to VLC after replacement, L is the label corresponding to VLC before replacement, $N_p(t)$ is common noise, and c is a number of members in set of VLCs having certain length.

11. The method according to claim 8, wherein the common noise is embedded in at least any of a DCT coefficient, a DC component, a macroblock pattern and a motion vector of the data.

12. The method according to claim 8, wherein the changing step includes a step of changing a level of the VLC portion based on the common noise.

13. The method according to claim 12, wherein the step of changing the level of the VLC portion includes a step of embedding information indicating in which direction, positive or negative, the level is changed.

14. The method according to claim 1, wherein in the step of embedding the common noise, a common noise amplified or damped based on a predetermined coefficient is embedded in the data.

15. The method according to claim 14, wherein when the unique noise of a client k which is one of the plurality of clients is N(k,t), the predetermined coefficient is determined by a function dependent on a variable t.

16. The method according to claim 1, wherein the data to be distributed is data of a still image or video.

17. The method according to claim 1, further comprising a step of receiving a distribution list D specifying a plurality of clients to which the data is to be distributed.

18. A non-transitory computer-readable storage medium comprising executable program code which, when executed by a processing device causes the processing device:
to generate a common noise, the common noise being based on noises unique to respective ones of a plurality of clients;
to embed the common noise in data to be distributed to the plurality of clients to make the data unusable; and
to distribute the data containing the embedded common noise to the plurality of clients, so that the data containing the embedded common noise is made usable by each of the plurality of clients using a unique noise generated in the client;
wherein the unique noise is generated according to a given parameter; and
wherein distributing the data containing the embedded noise comprises sending the parameter, and the data containing the embedded common noise is made usable by each of the clients using the unique noise generated according to the parameter received by the client.

19. A system for distributing data to a plurality of clients from a server, the system comprising:
at least one processing device comprising a processor coupled to a memory, the at least one processing device being configured:
to generate a common noise, the common noise being based on noises unique to respective ones of the plurality of clients;
to embed the common noise in the data to be distributed to the plurality of clients to make the data unusable; and
to distribute the data containing the embedded common noise to the plurality of clients, so that the data containing the embedded common noise is made usable by each of the plurality of clients using a unique noise generated in the client;
wherein the unique noise is generated according to a given parameter; and wherein distributing the data containing the embedded noise comprises sending the parameter, and the data containing the embedded common noise is made usable by each of the clients using the unique noise generated according to the parameter received by the client.

* * * * *